Figure 1:
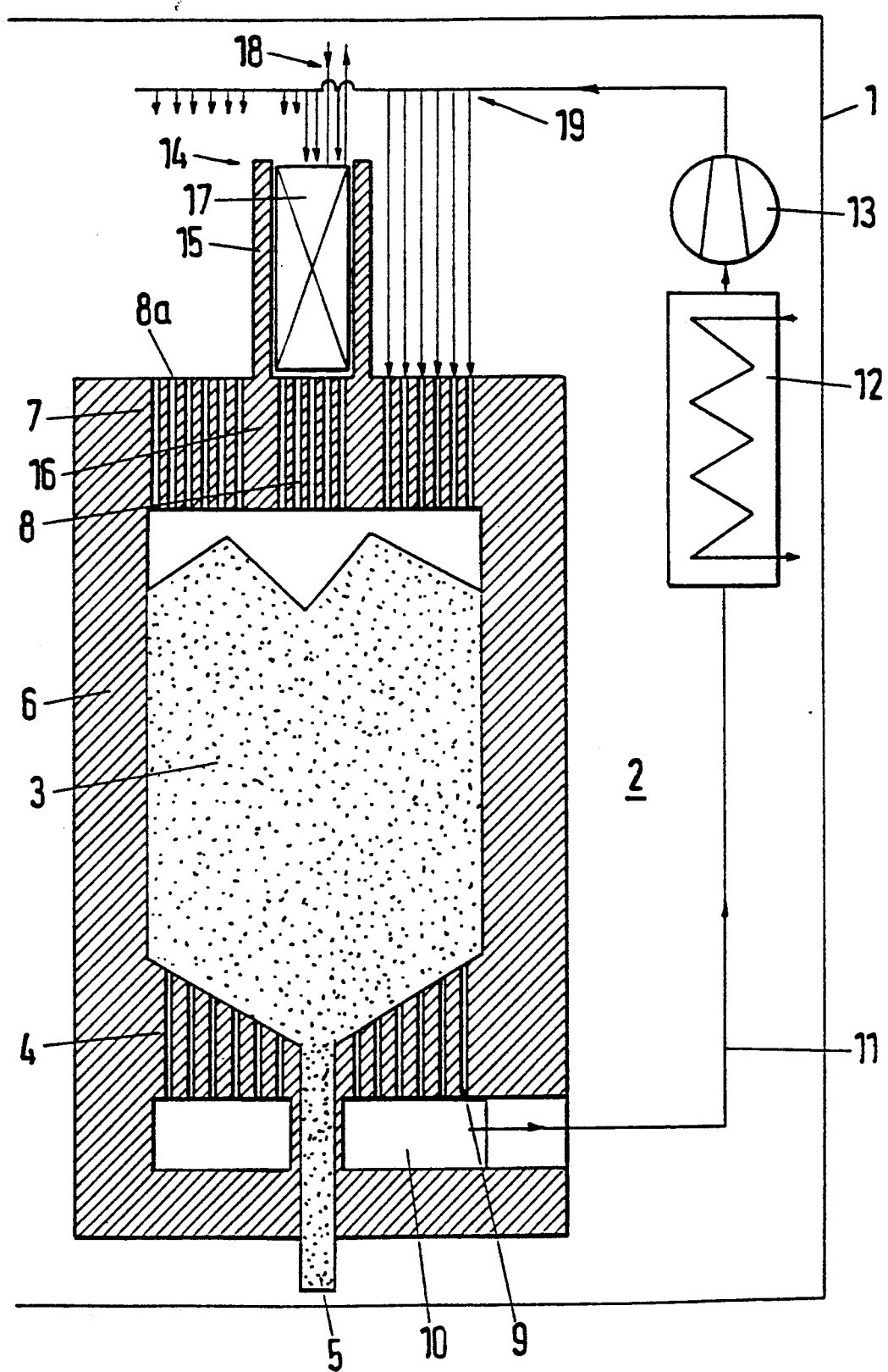

United States Patent [19]

Schöning et al.

[11] Patent Number: 5,265,134
[45] Date of Patent: Nov. 23, 1993

[54] GAS-COOLED NUCLEAR REACTOR PLANT WITH A HEAT EXCHANGER FOR REMOVING AFTERHEAT

[75] Inventors: Josef Schöning, Hambrücken; Hermann Schmitt, Winnweiler; Bernd Jürgens, Hirschberg, all of Fed. Rep. of Germany

[73] Assignee: Hochtemperatur-Reaktorbau GmbH, Dortmund, Fed. Rep. of Germany

[21] Appl. No.: 759,180

[22] Filed: Sep. 13, 1991

[30] Foreign Application Priority Data

Sep. 14, 1990 [DE] Fed. Rep. of Germany ....... 4029151

[51] Int. Cl.$^5$ ............................................. G21C 15/18
[52] U.S. Cl. ................................. 376/282; 376/298; 376/381
[58] Field of Search ............... 376/381, 385, 389, 390, 376/393, 282, 299, 298

[56] References Cited

U.S. PATENT DOCUMENTS 4,066,499  1/1978  Buthmann ........................ 376/299
4,642,214  2/1987  Zhong ............................. 376/221
4,689,194  8/1987  Wachholz et al. ................. 376/299
4,728,492  3/1988  Schoening ........................ 376/458

FOREIGN PATENT DOCUMENTS 3025336  1/1982  Fed. Rep. of Germany .

Primary Examiner—Donald P. Walsh
Assistant Examiner—Frederick H. Voss

[57] ABSTRACT

If an emergency arises in gas-cooled nuclear reactor plants having a heat exchanger for removing afterheat due to failure of a blower, the afterheat can be only inadequately removed because of the many deflections and restrictions in a primary circulation loop. In order to achieve adequate removal of afterheat solely on the basis of natural draught, a heat exchanger is located above a top reflector and reaches across a part of coolant gas bores in the top reflector. During normal operation of the nuclear reactor plant, there is a flow of cold gas through the heat exchanger in the direction toward the reactor core and in the event of an emergency, there is a flow of hot gas in a direction out of the center of the core of the reactor. A natural draught coolant circulation is established with the return of the cooled gas through the coolant gas bores in the top reflector.

4 Claims, 2 Drawing Sheets

GAS-COOLED NUCLEAR REACTOR PLANT WITH A HEAT EXCHANGER FOR REMOVING AFTERHEAT

The invention relates to a gas-cooled nuclear reactor plant, having a reactor core being surrounded by a bottom reflector, a side reflector and a top reflector and carrying a downward flow of coolant gas, the top reflector being penetrated by coolant gas bores, at least one steam generator, a blower associated with the steam generator for forced circulation of the coolant gas, and a heat exchanger for removing the afterheat.

Such a nuclear reactor plant is known from German Published, Non-Prosecuted Application DE-OS 34 25 144. A heat exchanger provided therein for the removal of the afterheat is located on the side of a core structure and in a switched-off state of the nuclear reactor, is operated by a blower with forced circulation. In the event of an emergency caused by blower failure, the heat transfer to the heat exchanger is intended to take place by natural convection. Due to the high flow losses in the lines and gas guides due to the many deflections and restrictions in the primary circulation, flow by natural draught is not adequately ensured. Moreover, metallic structural components on the long gas path are very heavily stressed by the high temperatures arising during such events, which can cause a reduction in service life.

It is accordingly an object of the invention to provide a gas-cooled nuclear reactor plant with a heat exchanger for removing afterheat, which overcomes the hereinafore-mentioned disadvantages of the heretofore-known devices of this general type and which provides an afterheat removal solely on the basis of natural draught.

With the foregoing and other objects in view there is provided, in accordance with the invention, a gas-cooled nuclear reactor plant, comprising a reactor core for carrying or being penetrated by a top to bottom flow of coolant gas; a bottom reflector, a side reflector and a top reflector surrounding the reactor core; at least one steam generator communicating with the reactor core; a blower associated with the at least one steam generator for forced circulation of the coolant gas; and a heat exchanger communicating with the blower and the reactor core for removing afterheat; the top reflector having a central region and having coolant gas bores formed therethrough including central coolant bores in the central region; the heat exchanger being disposed above the top reflector and having an end surface facing toward the top reflector and an end surface facing away from the top reflector, the end surface facing toward the top reflector reaching across the central region and the central coolant gas bores; and the heat exchanger having means for carrying or being penetrated by a cold gas flow from the surface facing away from the top reflector and a hot gas flow from the surface facing toward the top reflector.

During normal operation of the nuclear reactor plant, a part of the cold gas flows through the heat exchanger and passes from there through the coolant gas bores covered by the cross-section of the heat exchanger into the reactor core. The remaining part of the cold gas flows through the coolant gas bores in the top reflector that are not covered by the heat exchanger into the reactor core.

In the event of an emergency caused by a blower and/or steam generator failure, hot gas flows from below from the center of the core through the heat exchanger in a kind of chimney effect. The hot gas releases its heat to a secondary circulation loop which is filled with water as the medium. The thus cooled gas flows through the coolant gas tubes in the top reflector which are not covered by the heat exchanger back into the outer core region. Together with the short flow path, the chimney effect creates a stable natural draught cooling circulation with low flow losses. Additional metallic gas guides are not required.

In accordance with a concomitant feature of the invention, there is provided a shell of the heat exchanger for guiding the gas, the shell being formed of the ceramic material of the top reflector, so that no elevated temperatures arise on metallic structures.

Other features which are considered as characteristic for the invention are set forth in the appended claims.

Although the invention is illustrated and described herein as embodied in a gas-cooled nuclear reactor plant with a heat exchanger for removing the afterheat, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
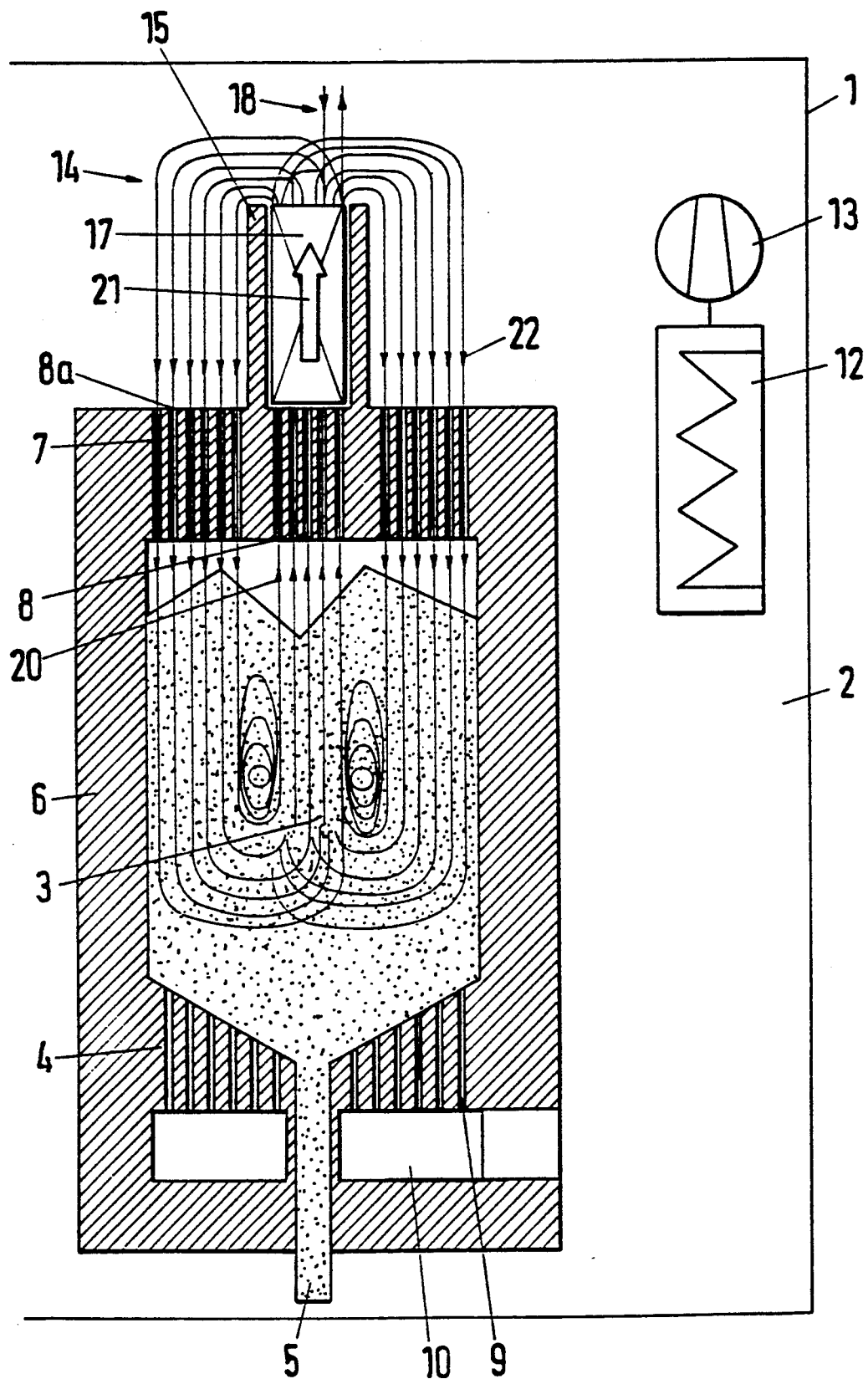

FIG. 1 is a schematic circuit diagram of a nuclear reactor plant according to the invention including a longitudinal-sectional view of a pressure vessel with a reactor core disposed therein and a heat exchanger; and FIG. 2 is a view similar to FIG. 1 showing a representation of the gas circulation with afterheat removal by natural circulation.

Referring now to the figures of the drawing in detail and first, particularly, to FIG. 1 thereof, there is seen a pressure vessel 1 of a gas-cooled nuclear reactor plant, having a cavern 2 in which a reactor core 3 formed of a loose bed of spherical fuel elements is disposed. The reactor core rests on a bottom reflector 4 which is penetrated by a discharge tube 5 for the spherical fuel elements. In addition, the reactor core is surrounded by a side reflector 6 and is closed from above by a top reflector 7. The top reflector has a multiplicity of coolant gas bores 8, 8a formed therein, which serve to introduce cold gas into the reactor core. The cold gas flows through the reactor core while being heated and leaves as hot gas passing through bores 9 formed in the bottom reflector 4 into a hot gas header space 10. The gas passes through a line 11 to a steam generator 12 as hot gas and leaves the latter as cold gas, in order to restart the circulation with the help of a blower 13.

An end surface of a heat exchanger 14 reaches across a central region of the upper surface of the top reflector 7 and therefore across the coolant gas bores 8 located in this central region. A shell or jacket 15 of the heat exchanger represents an extension of ceramic components 16 of the top reflector. A heat-exchanging component 17 of the heat exchanger is formed of a tube system 18, to which water can be admitted. The cold gas which flows past the tube system 18 is supplied through a distribution device 19 in normal operation of the nuclear reactor plant and passes through the coolant gas bores 8 of the central region covered by the heat exchanger into the reactor core 3. A remaining cold gas stream passes through the coolant gas bores 8a which are not covered by the heat exchanger, into the reactor core. Since water at the temperature of the cold gas flows through the tube system 18 in normal operation of the nuclear reactor, no heat-exchanging effect takes place when the cold gas flows past the tube system 18, so that there is no interference with normal operation of the nuclear core reactor by the placement of the heat exchanger 14 directly on the upper surface of the top reflector 7.

If an emergency which leads to a shut-down of the nuclear reactor occurs due to failure of the steam generator or of the blower, the forced circulation of the cold gas is interrupted. The heat exchanger acts as a chimney with natural draught for the hot gas collected in the center of the core. Upon flowing through the heat exchanger, the hot gas releases its heat to the water in the tube system 18. The gas, which is cooled after leaving the heat exchanger, continues its natural circulation by penetrating into outer zones, as viewed radially, of the reactor core through the coolant gas tubes 8a, which are not covered by the heat exchanger, and after it has been heated, re-enters the natural draught of the heat exchanger.

The afterheat removal circulation is diagrammatically represented in FIG. 2. The hot gas from the center of the core flows in the direction of an arrow 20 through the coolant gas bores 8. An arrow 21 indicates the flow direction of the gas in the heat exchanger 14. The gas which has been cooled flows in the direction of arrows 22 above the heat exchanger, and after a deflection assisted by the cover of the pressure vessel 1, it flows through the coolant gas bores 8a into the edge regions of the reactor core.

We claim:

1. A gas-cooled nuclear reactor plant, comprising a reactor core for carrying a downward flow of coolant gas; a bottom reflector, a side reflector and a top reflector surrounding said reactor core; at least on steam generator communicating with said reactor core; a blower associated with said at least one steam generator for forced circulation of the coolant gas; and a heat exchanger communicating with said reactor core for removing afterheat; said top reflector having coolant gas bores formed therethrough in a central region and in a peripheral region thereof; said heat exchanger being disposed above said top reflector and having an end surface facing toward said top reflector and reaching across said coolant gas bores formed int he central region of said top reflector; and means associated with said heat exchanger for carrying a gas flow from said top reflector through said heat exchanger, and back into said reactor core through said coolant gas bores formed in the peripheral region of said top reflector.

2. The gas-cooled nuclear reactor plant according to claim 1, wherein said heat exchanger includes a shell for guiding the gas, said shell and said top reflector being formed of the same material.

3. The gas-cooled nuclear reactor plant according to claim 2, wherein said shell and said top reflector are integral.

4. In a gas-cooled nuclear reactor plant having a reactor core for carrying a downward flow of coolant gas, an afterheat removal device comprising a bottom reflector, a side reflector and a top reflector surrounding said reactor core; and a heat exchanger communicating with said reactor core; said top reflector including a central region having central coolant gas bores formed therethrough and a peripheral region having peripheral coolant gas bores formed therethrough; said heat exchanger being disposed above said top reflector and having a lower end surface communicating with said central coolant gas bores and an upper end surface communicating with said peripheral coolant gas bores; and said heat exchanger having means for carrying a gas flow from said reactor core through said central bores, through said heat exchanger and through said peripheral coolant gas bores back into said reactor core.

* * * * *